(12) United States Patent
Lee

(10) Patent No.: US 7,357,628 B2
(45) Date of Patent: *Apr. 15, 2008

(54) CLAMPING FORCE SENSOR SYSTEM

(76) Inventor: Tony Lee, 6F, No. 5, Lane 83, Kwang Fu Road, Sec. 1, San Chung City, Taipei Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/366,547

(22) Filed: Mar. 3, 2006

(65) Prior Publication Data

US 2006/0204602 A1    Sep. 14, 2006

(30) Foreign Application Priority Data

Mar. 8, 2005    (TW) ............... 94203534 U

(51) Int. Cl.
*B29C 45/77* (2006.01)
(52) U.S. Cl. ............ 425/170; 164/151; 164/154.8; 425/149
(58) Field of Classification Search ............... 425/149, 425/170, 451.9, 595; 164/151, 154.8
See application file for complete search history.

(56) References Cited

U.S. PATENT DOCUMENTS

| | | | | |
|---|---|---|---|---|
| 3,579,741 A | * | 5/1971 | Schwartz | ............ 425/149 |
| 4,020,681 A | * | 5/1977 | O'Brien | ............ 73/760 |
| 4,090,405 A | * | 5/1978 | McKee | ............ 73/152.61 |
| 4,370,116 A | * | 1/1983 | Groom | ............ 425/171 |
| 4,466,477 A | * | 8/1984 | Alofs | ............ 164/151.2 |
| 4,493,362 A | * | 1/1985 | Moore et al. | ............ 164/457 |
| 4,685,876 A | * | 8/1987 | Loscei | ............ 425/170 |
| 5,154,084 A | * | 10/1992 | Sonderegger et al. | ......... 73/761 |
| 6,651,510 B2 | * | 11/2003 | Noma | ............ 73/856 |
| 6,935,188 B2 | * | 8/2005 | Lee | ............ 73/860 |
| 6,941,820 B2 | * | 9/2005 | Lee | ............ 73/860 |

* cited by examiner

*Primary Examiner*—James Mackey
(74) *Attorney, Agent, or Firm*—Rosenberg, Klein & Lee

(57) ABSTRACT

A clamping force sensor system includes a clamping force sensor device, a signal-converting program carrier, and an output device. The clamping force sensor device includes a body mounted to a tie bar of a forming machine. The clamping force sensor device further includes a sensor mounted to the body, with a portion of the sensor exposed outside of the body. The signal-converting program carrier is electrically connected to the sensor by at least one signal line. The signal-converting program carrier includes a built-in program for converting a signal from the at least one signal line into a mold-clamping force. The output device is electrically connected to the signal-converting program carrier for outputting the mold-clamping force.

4 Claims, 5 Drawing Sheets

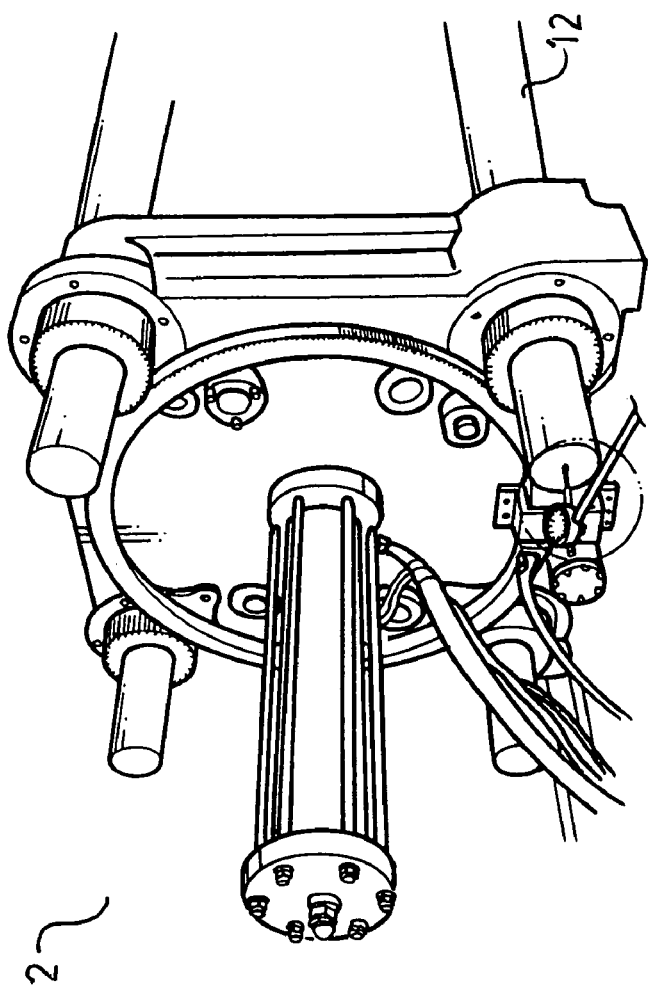
PRIOR ART
FIG. 1
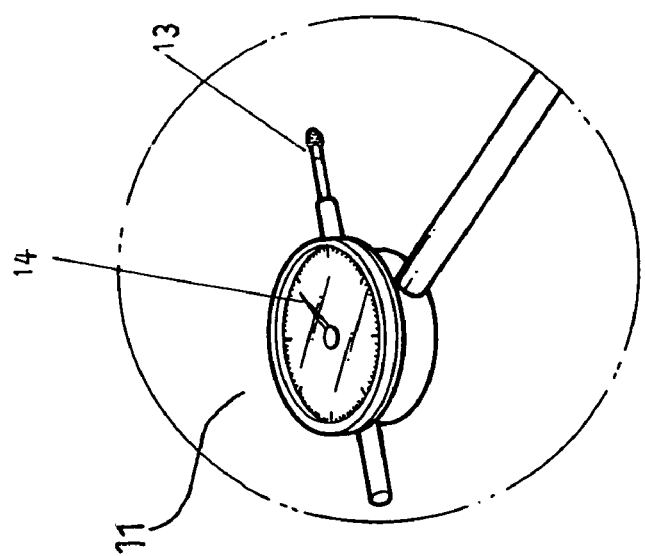
PRIOR ART
FIG. 1A

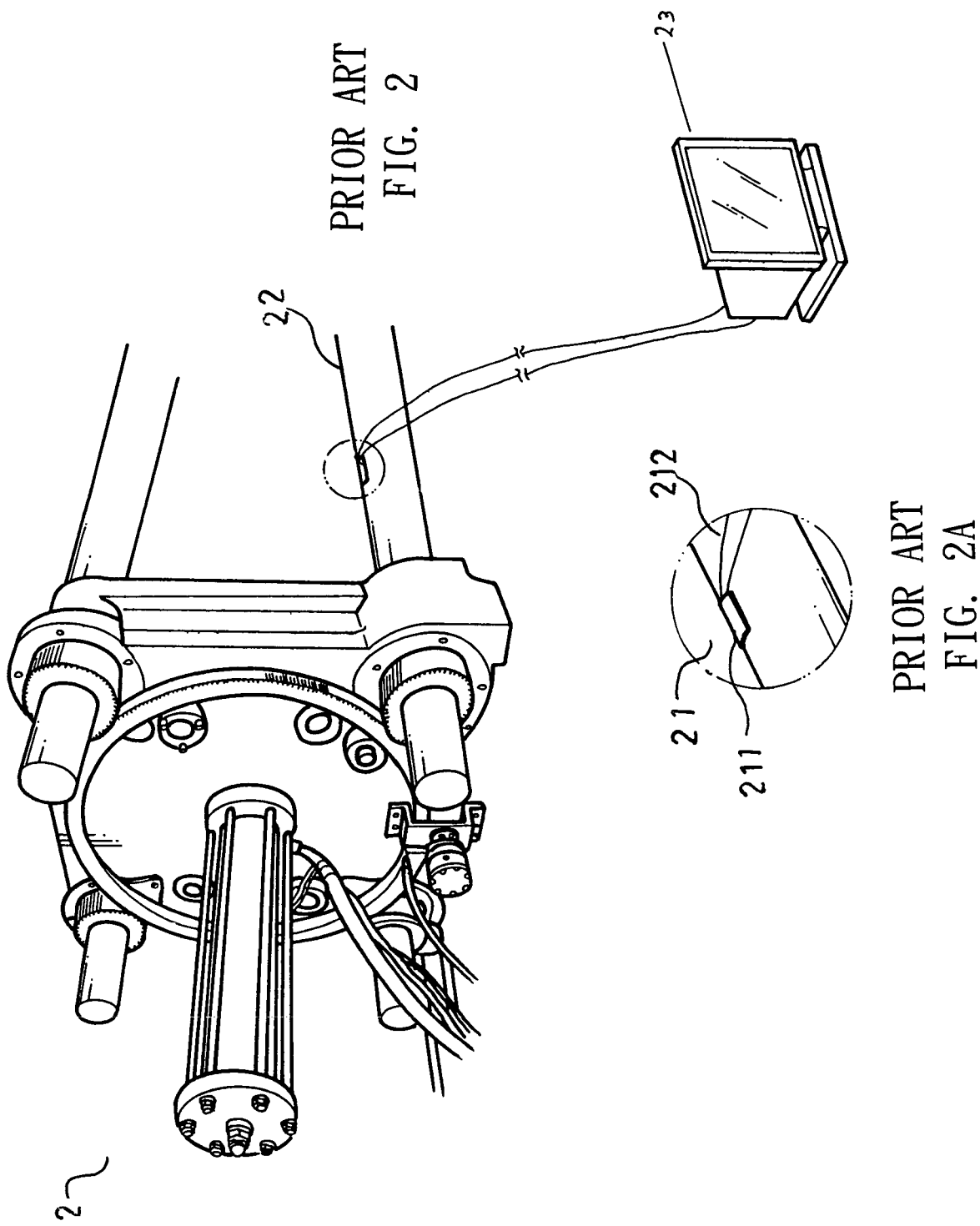
PRIOR ART
FIG. 2
PRIOR ART
FIG. 2A

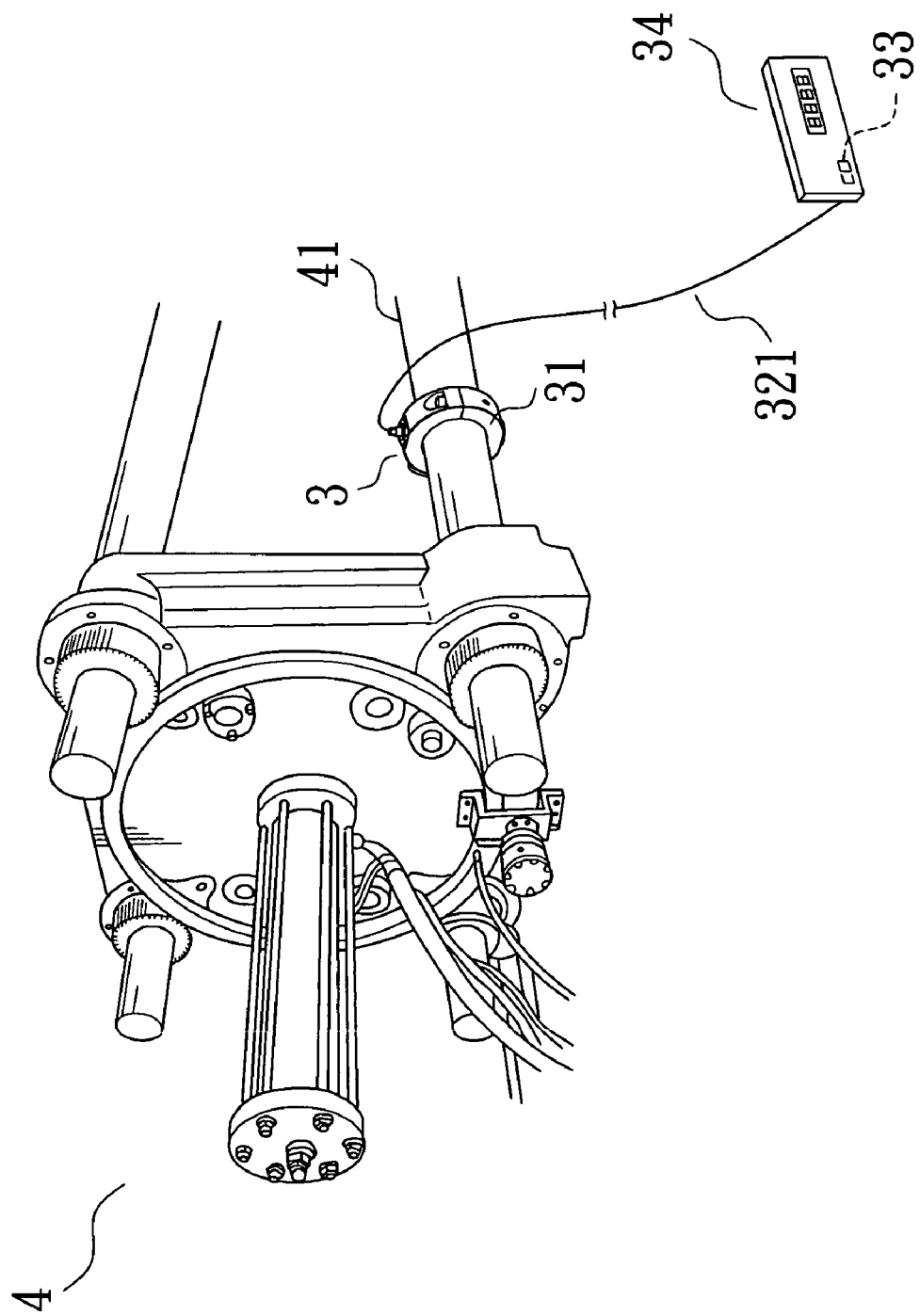
FIG. 3

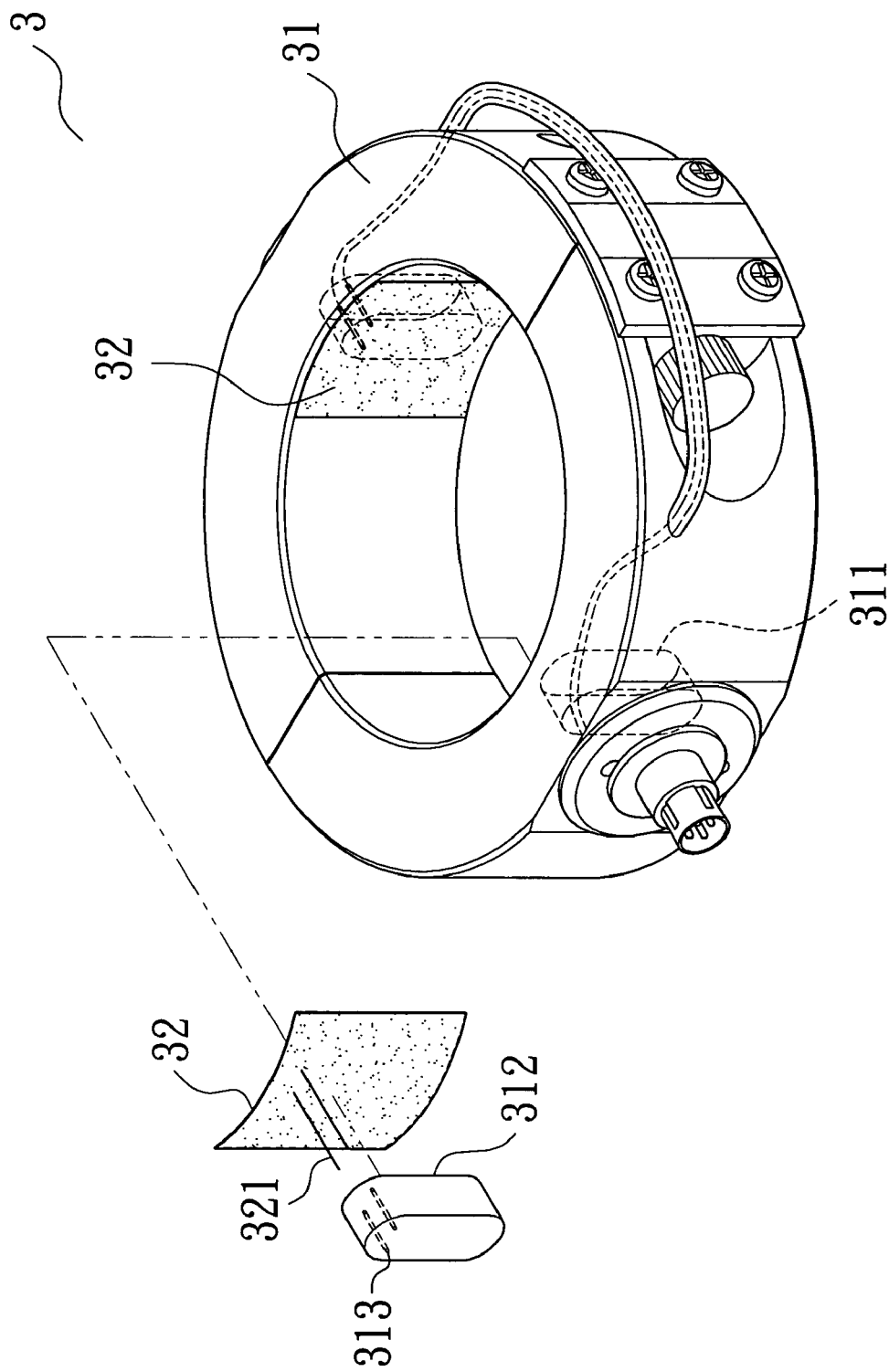
FIG. 4

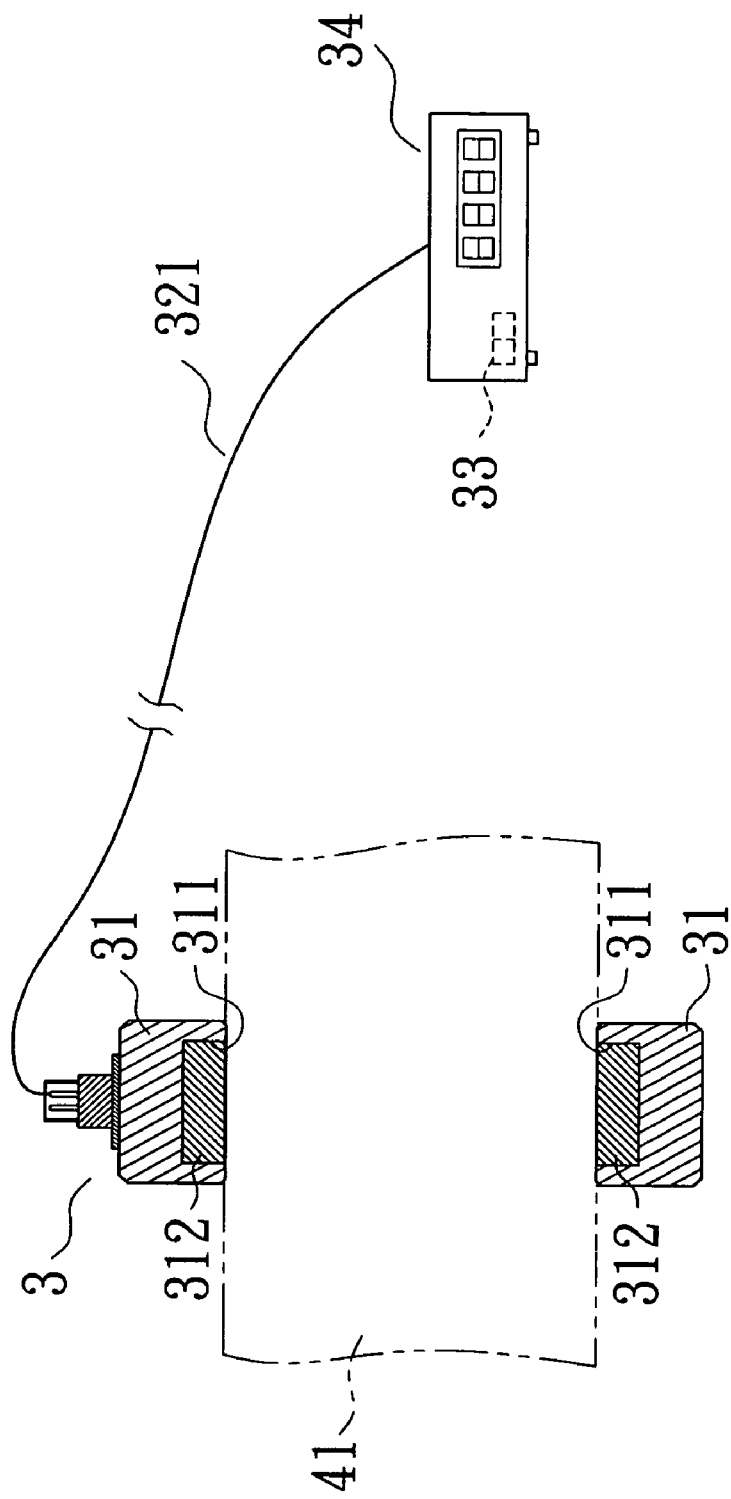
FIG. 5

CLAMPING FORCE SENSOR SYSTEM

BACKGROUND OF THE INVENTION

1. Field of the Invention

The present invention relates to a clamping force sensor system. More particularly, the present invention relates to a clamping force sensor system that is capable of detecting and displaying clamping forces.

2. Description of the Related Art

In mold-clamping operation of a typical injection molding machine or die casting machine, plastic material is fed into a mold chamber of a mold, and a movable clamping cap is moved to carry out opening/closing of the mold. The pressure applied to the mold decides formation precision of the plastic material whereas the product quality largely depends on the evenness of the clamping forces. Hence, detection of the clamping forces is required and adjustments based on the measurement results may proceed.

Four tie bars are used in a typical injection molding machine or die casting machine of either vertical type or horizontal type. FIGS. 1 and 1A of the drawings illustrate a conventional meter 11 mounted near a rear end of each tie bar 12 of a forming machine 2. When the tie bar 12 has any minor change in its overall length during the process of clamping the mold to touch a probe 13 of the meter 11, the probe 13 would contact with and press against a spring (not shown) inside the meter 11, so that the amount of axial stretch of the tie bar 12 may be read from a pointer 14 of the meter 11. The axial force (i.e., the mold-clamping force) applied to the tie bar 12 can be calculated by one or more equations. However, the conventional meter 11 has low accuracy, and the spring inside the meter is subject to elastic fatigue after being used over a long time. Further, an operator has to visually observe the reading of the axial stretch amount of the tie bar 12 on the conventional meter 11. Errors might be caused due to different observation angles and personal subjective judgment or negligence, leading to inaccurate data.

FIGS. 2 and 2A show another conventional strain meter 21 for measuring the clamping force. The strain meter 21 mainly includes a sensing element 211 having two signal lines 212 electrically connected to a monitor 23, so that a signal from the sensing element 211 may be processed by an operation unit and amplified by an amplifier unit, and finally displayed on the monitor 23. This type of strain meter 21 is flatly adhered to an outer surface of each tie bar 22 of a forming machine 2. When a movable clamping cap slides on the tie bars 22 relative to a fixed clamping cap to open or close the mold, the sensing element 211 is able to detect a change in the electric resistance of the tie bars 22 due to the axial stretch thereof, thereby measuring the clamping force at the time the mold is closed. However, the costly high-precision strain meter 21 must be discarded, for the sensing element 211 is damaged when it is removed from the outer surface of the tie bar 22. Further, it is troublesome, time-consuming, and difficult to adhere the sensing elements to the tie bars 22 at uniform angle and tightness, and therefore have adverse influence on the measurements. Sandpapers and pre-installation cleaning jobs are required.

U.S. Pat. No. 6,935,188 discloses a surface-mounted type clamping force strain meter associated with a locating seat. U.S. Pat. No. 6,941,820 discloses a cuff type clamping force sensor. In these patents, a clamping force sensor includes a locating seat mounted adjacent to a tie bar, with a portion of a sensing element in contact with an outer surface of the tie bar for detecting a change in the electric resistance of the tie bar, thereby detecting the stretch. However, the signal is an electric signal regarding the resistance. Although the clamping force can be obtained by converting the electric signal into the corresponding value in terms of stretch and then checking the Yong's modulus and a load/strain chart, the procedures are troublesome and time-consuming.

SUMMARY OF THE INVENTION

A clamping force sensor system in accordance with the present invention comprises a clamping force sensor device, a signal-converting program carrier, and an output device. The clamping force sensor device comprises a body adapted to be mounted to a tie bar of a forming machine. The clamping force sensor device further comprises a sensor mounted to the body, with a portion of the sensor exposed outside of the body. The signal-converting program carrier is electrically connected to the sensor by at least one signal line. The signal-converting program carrier comprises a built-in program for converting a signal from the at least one signal line into a mold-clamping force. The output device is electrically connected to the signal-converting program carrier for outputting the mold-clamping force.

In an example, the body is annular and the portion of the sensor is exposed to an inner side of the body.

Preferably, the signal-converting program carrier is a chip with the built-in program.

Preferably, the body comprises a compartment, and a soft pad is mounted in the compartment. The soft pad comprises at least one through-hole through which the signal line extends.

Preferably, the output device is a display.

The clamping force sensor system in accordance with the present invention provides a rapid solution for obtaining and displaying the clamping force without the troublesome use of a chart.

Other objectives, advantages, and novel features of the invention will become more apparent from the following detailed description when taken in conjunction with the accompanying drawings.

BRIEF DESCRIPTION OF THE DRAWINGS

FIG. 1 is a perspective view of illustrating use of a conventional meter on a forming machine.

FIG. 1A is an enlarged view of a circled portion in FIG. 1.

FIG. 2 is a perspective view illustrating use of a conventional strain meter on a forming machine.

FIG. 2A is an enlarged view of a circled portion in FIG. 2.

FIG. 3 is a perspective view illustrating use of a clamping force sensor system in accordance with the present invention on a forming machine.

FIG. 4 is a perspective view, partly exploded, of a clamping force sensor device of the clamping force sensor system in accordance with the present invention.

FIG. 5 is a schematic view illustrating mounting of the clamping force sensor device on the forming machine.

DETAILED DESCRIPTION OF THE PREFERRED EMBODIMENT

Referring to FIGS. 3 through 5, a clamping force sensor system in accordance with the present invention comprises a clamping force sensor device 3, a signal-converting program carrier 33, and an output device 34. The clamping force sensor device 3 comprises a body 31 and at least one senor 32. In this example, the body 31 is annular and mounted around a tie bar 41 of a forming machine 4. Nevertheless, the body 31 can be of any other type that can be fixed on the circumference of the tie bar 41. The body 31 includes at least one compartment 311 for receiving a soft pad 312. The pad 312 includes one or more through-holes 313 through which one or more signal lines 321 extend.

In this example, there are two sensors 32 coupled to the body 31. Each sensor 32 has a portion exposed outside of the body 31. In a case that the body 31 is annular, the portion of each sensor 32 is exposed to an inner side of the body 31. Signal lines 321 extend from each sensor 32 to the signal-converting program carrier 33. Preferably, the signal lines 321 extend through the through-holes 313 in the pad 312 to provide stable transmission.

The signal-converting program carrier 33 includes a built-in program for converting the stretch or elongation of the tie bar 41 into the clamping force (or mold-clamping force). The signal-converting program carrier 33 may be mounted in the body 31 or the output device 34. In this example, the signal-converting program carrier 33 is mounted in the output device 34. In a case the signal-converting program carrier 33 is mounted in the body 31, the signal-converting program carrier 33 may be mounted in the pad 312 and thus protected by softness and elasticity of the pad 312. The signal-converting program carrier 33 may be a chip with a built-in program for calculating and obtaining the mold-clamping force.

The output device 34 is electrically connected to the signal-converting program carrier 33. The output device 34 may be a display for displaying the clamping force. Alternatively, the output device 34 may be a printer or a siren.

The output device 34 may be used with one or more tie bas 41. In this example, the output device 34 are used with four tie bars 41 such that the clamping forces of the tie bars 41 can be displayed simultaneously. The sum of the clamping forces of the tie bars 41 can also be displayed.

In a case that the clamping force exceeds a manually input threshold, an alarming device is provided to warn the user by lighting, buzzing, and/or vibrations. This assures stable quality of the products and prevents damage to the mold. The threshold can be determined by inputting the material and size of the tie bars 41 and a built-in program is provided for calculating the threshold based on the information of the material and size of the tie bars 41.

Zeroing is required before the mold is closed for the purposes of eliminating accumulation of errors. In this example, auto reset is provided. Alternatively, a custom mode can be set, wherein a force value for full scale of the forming machine can be manually input so that the various force values can be displayed when subject to different forces within the range of the full scale of the forming machine.

When the mold is closed and pressure is applied to a fixed portion (not shown) of the mold (not shown) by a back plate (not shown), the applied pressure is fed back to the tie bars (i.e., the clamping force). The elongation of the tie bar 41 result in a change in the resistance of the tie bar 41 which is detected by the sensors 32 and signals are transmitted through the signal lines 321 to the signal-converting program carrier 33 for calculation of the clamping force.

The clamping force sensor system in accordance with the present invention provides a rapid solution for obtaining and displaying the clamping force without the troublesome use of a chart.

Although specific embodiments have been illustrated and described, numerous modifications and variations are still possible without departing from the essence of the invention. The scope of the invention is limited by the accompanying claims.

What is claimed is:

1. A clamping force sensor system comprising:
    a clamping force sensor device comprising a body adapted to be mounted to a tie bar of a forming machine, the clamping force sensor device further comprising a sensor mounted to the body, with a portion of the sensor exposed outside of the body;
    a signal-converting program carrier electrically connected to the sensor by at least one signal line, the signal-converting program carrier comprising a built-in program for converting a signal from said at least one signal line into a mold-clamping force;
    the body comprises a compartment, a soft pad being mounted in the compartment, the soft pad comprising at least one through-hole through which said at least one signal line extends; and
    an output device electrically connected to the signal-converting program carrier for outputting the mold-clamping force.

2. The clamping force sensor system as claimed in claim 1 wherein the body is annular and wherein the portion of the sensor is exposed to an inner side of the body.

3. The clamping force sensor system as claimed in claim 1 wherein the signal-converting program carrier is a chip with the built-in program.

4. The clamping force sensor system as claimed in claim 1 wherein the output device is a display.

* * * * *